(12) United States Patent
Eckelkamp-Baker et al.

(10) Patent No.: US 7,227,111 B2
(45) Date of Patent: Jun. 5, 2007

(54) OPTICAL INERTIAL REFERENCE UNIT FOR KILOHERTZ BANDWIDTH SUBMICRORADIAN OPTICAL POINTING AND JITTER CONTROL

(75) Inventors: Dan Eckelkamp-Baker, Rio Rancho, NM (US); Henry R. Sebesta, Albuquerque, NM (US)

(73) Assignee: A-Tech Corporation, Albuquerque, NM (US)

( * ) Notice: Subject to any disclaimer, the term of this patent is extended or adjusted under 35 U.S.C. 154(b) by 85 days.

(21) Appl. No.: 11/020,189

(22) Filed: Dec. 27, 2004

(65) Prior Publication Data

US 2005/0161578 A1    Jul. 28, 2005

Related U.S. Application Data

(60) Provisional application No. 60/481,829, filed on Dec. 24, 2003.

(51) Int. Cl.
*G01J 1/20* (2006.01)
*G01C 21/02* (2006.01)

(52) U.S. Cl. .................. 250/201.1; 250/203.1
(58) Field of Classification Search ........... 250/201, 250/203.1, 205; 356/73; 73/514.01
See application file for complete search history.

(56) References Cited

U.S. PATENT DOCUMENTS 4,315,610 A * 2/1982 Malueg ............ 244/3.16
5,067,351 A 11/1991 Laughlin
5,469,053 A 11/1995 Laughlin
6,700,109 B2 * 3/2004 Eckelkamp-Baker et al. ........ 250/203.1
2002/0145102 A1 10/2002 Eckelkamp-Baker et al.
2005/0161578 A1 7/2005 Eckelkamp-Baker et al.

* cited by examiner

*Primary Examiner*—Stephone B. Allen
*Assistant Examiner*—Don Williams
(74) *Attorney, Agent, or Firm*—Connolly Bove Lodge & Hutz LLP

(57) ABSTRACT

A device providing an inertially stabilized laser beam as an optical reference. The device consists of a base and a small stabilized optical platform that emits the laser beam. The platform connects to the base through a mechanical flexure that allows relative motion in two axes. High-bandwidth angular rate sensors affixed to the platform measure platform motion in inertial space. Linear displacement sensors measure relative motion between base and platform. A closed-loop control system accepts these sensor measurements and command actuators that null the sensed platform motions, maintaining the optical platform fixed in inertial space. The digital controller implements a Sensor Blending Kalman Filter that blends high frequency signals from the platform with low frequency signals from a DC sensor (gyroscope) external to this device but affixed to the common base. The controller enables both stabilization of the laser beam and commanded pointing of the beam in inertial space.

62 Claims, 6 Drawing Sheets

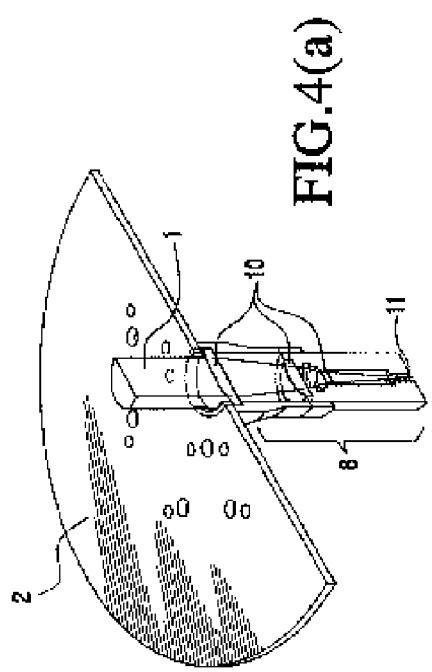
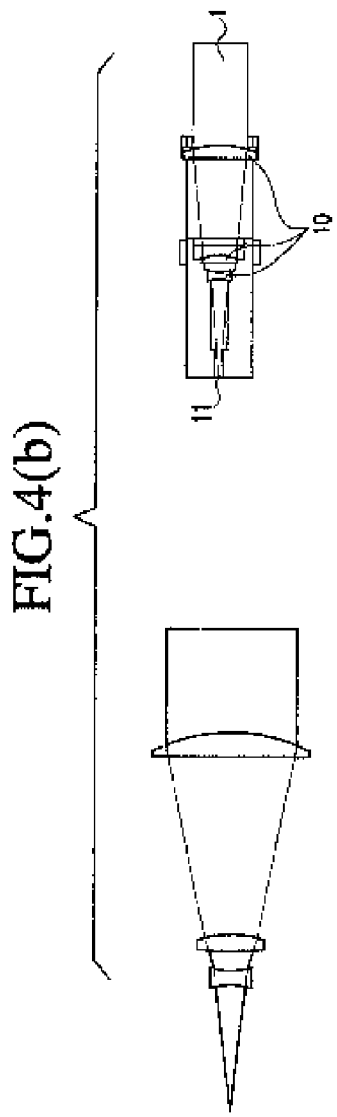
FIG.4(a)
FIG.4(b)

OPTICAL INERTIAL REFERENCE UNIT FOR KILOHERTZ BANDWIDTH SUBMICRORADIAN OPTICAL POINTING AND JITTER CONTROL

This application is based on provisional application No. 60/481,829, filed Dec. 24, 2003, and claims priority thereto.

BACKGROUND OF THE INVENTION

The present invention relates generally to electro-optical systems, and more specifically, to systems that require line of sight pointing and stabilization.

Precision optical instruments mounted on mobile platforms need to point accurately and reject disturbances to the line of sight. At sub-microradian levels of accuracy, significant disturbances to the line of sight originate within the optical system itself. To sample and correct for these errors requires the creation of an optical reference in inertial space, similar to a fixed star. Such a reference allows detection and correction of internal jitter sources along the optical train, and this "virtual star" supports both increased pointing accuracy and line of sight stabilization requirements.

A previously developed system approach developed by the assignee of the present invention is disclosed in U.S. patent application Ser. No. 09/828,483, entitled "Optical Line-of-Sight Pointing and Stabilization System." That system includes a set of primary optics and relay optics that can be used to receive an image or transmit a laser. An inertially stable reference laser beam is injected into the primary optics and transmit the same beam path as the received image or transmitted laser. A jitter rejection mirror is located in the path of the optical system near the point at which an image is viewed or at which a laser originates in a laser pointing system. The jitter rejection mirror is displaced in a direction to oppose any change in the apparent position of the inertially stable reference laser beam.

For the purpose of jitter suppression, the Optical Inertial Reference Unit serves as an inertially stable platform on which a reference laser is mounted. This means that the reference laser beam leaves the Optical Inertial Reference Unit platform with minimal jitter induced by the host structure. Therefore it behaves as a "virtual star." The reference laser beam samples the optical train jitter between the optical inertial reference unit and the auto-alignment sensor. The auto-alignment system uses an optical position sensor to sense the relative angle of the reference laser with respect to its boresight position. The sensed position is sampled, scaled, and compensated to send torque commands to the fast steering mirror. This digital alignment servo loop continuously seeks to hold the light of the virtual star on the null position of the alignment position sensor. This greatly attenuates the jitter in the optical train. Since the instrument beam paths (imaging and propagating) are common to that of reference laser, their jitter is also reduced.

The Optical Inertial Reference Unit platform also provides an inertial pointing reference. Once the sensors are initialized and calibrated in inertial space, they maintain knowledge of their attitude in that space. The Optical Inertial Reference Unit reference beam can then be commanded to point in any direction in that space. With the IRU platform mounted on the primary mirror, the angle between the IRU stable platform and its base can be used as an error signal to drive the primary mirror gimbals. This moves the line of sight of the optical system to desired pointing.

A previously developed inertial reference unit approach developed by the assignee of the present invention is disclosed in U.S. patent application Ser. No. 10/173,627 entitled "Optical Inertial Reference Generator." That approach described a stabilized laser source as an optical line of sight reference.

The assignee of the present invention has reduced the Optical Inertial Reference Generator to the practice for two applications that differ primarily in performance. The first reduction to practice is an Optical Inertial Reference Unit for a NASA scientific program with a performance goal of 150 nanoradian root mean square residual beam jitter. The second reduction to practice, for a defense application, has a far more stringent 20 nanoradian residual beam jitter performance goal. The present invention embodies key advances in the state of the art to enable these compact high-performance applications.

Historically, it has been customary to mount a low-frequency (DC) sensor, for example a gyroscope, on a stabilized platform to provide feedback. This is undesirable for several reasons: (1) current technologies for high-accuracy low-drift-rate DC sensors result in large and massive sensors; these large heavy sensors necessitate increased size and weight of the platform which limits control bandwidth, (2) high-accuracy low-drift-rate DC sensors attached to the platform introduce asymmetries to the moments of inertia which further complicate the controls, (3) since high-performance DC sensors are expensive system components, it is costly and redundant to mount a DC sensor on the platform when another source of DC signals is already available within the system, and (4) some DC sensors impart reaction disturbances into the platform, thereby reducing stabilization performance or complicating the controls. The present invention removes the low-frequency DC sensor from the platform and implements an innovative Sensor Blending Kalman Filter to incorporate low-frequency signals from off-platform into the platform control loop. This innovation results in smaller size, lower weight, lower power, lower cost, more benign platform jitter, and better residual jitter performance.

In addition, the historic state of the art for stabilized platforms did not consider the use of redundant symmetrically arranged sensors and alignment of platform center of mass, center of rotation, and center of force application. The current invention embodies an innovative use of symmetry and redundant sensors to suppress unwanted moments, lower the drive requirements, and improve stabilization performance.

Two key components of the preferred embodiment of the present invention have been previously disclosed by the assignee of the present invention. First, a previously developed high-bandwidth angular rate sensor is disclosed in U.S. Pat. No. 5,067,351, entitled "Magnetohydrodynamic Angular Rate Sensor for Measuring Large Angular Rates." Second, a previously developed high-precision linear displacement sensor is disclosed in U.S. Pat. No. 5,469,053, entitled "E/U Core Linear Variable Differential Transformer." These two low-noise high-bandwidth sensors enable the preferred embodiment of the present invention to achieve very high optical reference beam stability.

It is an objective of the present invention to provide a compact optical reference unit with kilohertz bandwidth sub-microradian pointing and jitter control.

BRIEF SUMMARY OF THE INVENTION

To accomplish the above and other objectives, the present invention comprises an apparatus for providing a stable optical reference that can be redirected in inertial space. More particularly, the apparatus provides an optical beam with residual jitter and pointing offset at angular accuracies of hundreds of nanoradian or better.

The apparatus comprises a base for mounting the apparatus onto an external optical system structure and a stabilized platform that is connected to the base through a mechanical flexure. The stabilized platform moves in two dimensions, tip and tilt, relative to the base, and the optical reference beam originates from the platform and is fixed relative to the platform. Inertial motion sensors affixed to the platform measure platform motion in inertial space. Actuators between base and platform maintain the platform stable in inertial space or offset the beam in inertial space. Linear displacement sensors measure the displacement between platform and base.

The preferred embodiment of this apparatus achieves high performance through low-noise high-bandwidth inertial rate sensors, a small symmetric platform, and a high-bandwidth active stabilization servo. In addition, the preferred embodiment of this apparatus incorporates a digital feedback control system that accepts signals from the inertial sensors on the platform, the actuators, the linear displacement sensors, and an external low-frequency DC sensors such as a gyroscope that is rigidly affixed relative to the base of this apparatus. The digital controller employs a Sensor Blending Kalman Filter and a model of the dynamics of the apparatus to estimate its state. The controller accepts inertial pointing commands from an external system and commands the actuators to implement pointing and inertial stabilization of the optical beam.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 4A illustrates an exemplary optical subassembly that is a component of the systems shown in FIGS. 2A and 3A;

FIG. 4B is a detail of FIG. 4A;

FIG. 7 illustrates the algorithm defined by the Kalman filter;

FIG. 8 illustrates the generalized system block diagram of the multiple sensor blending Kalman filter;

FIG. 9 illustrates the simulation used to evaluate the Kalman filter performance;

FIG. 10 shows the performance in inertial rate of the platform with Kalman filtering; and FIG. 11 shows the inertial angle of the stable platform.

DETAILED DESCRIPTION OF THE INVENTION

Figure 1A:
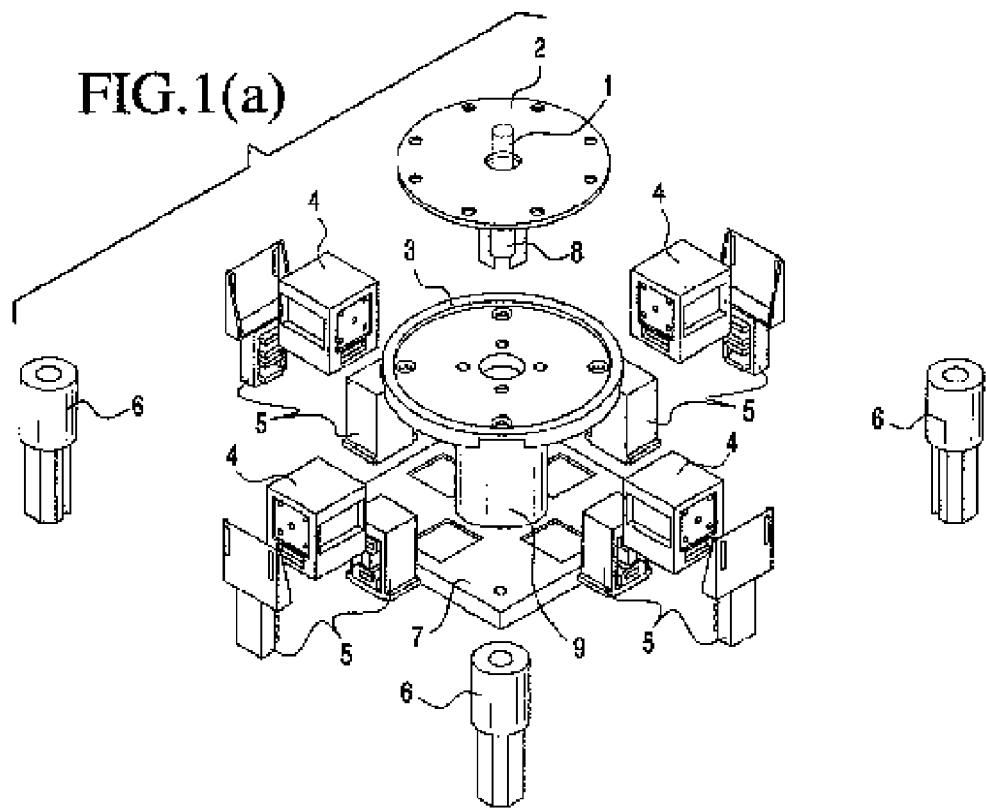
FIG. 1A illustrates an exploded mechanical diagram of an exemplary optical inertial unit.
Figure 1B:
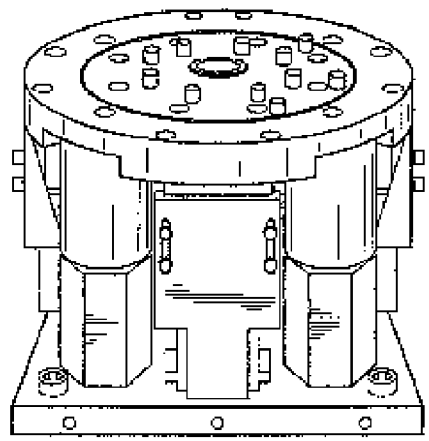
FIG. 1B is an illustrative photograph of the unit of FIG. 1A.
Figure 2A:
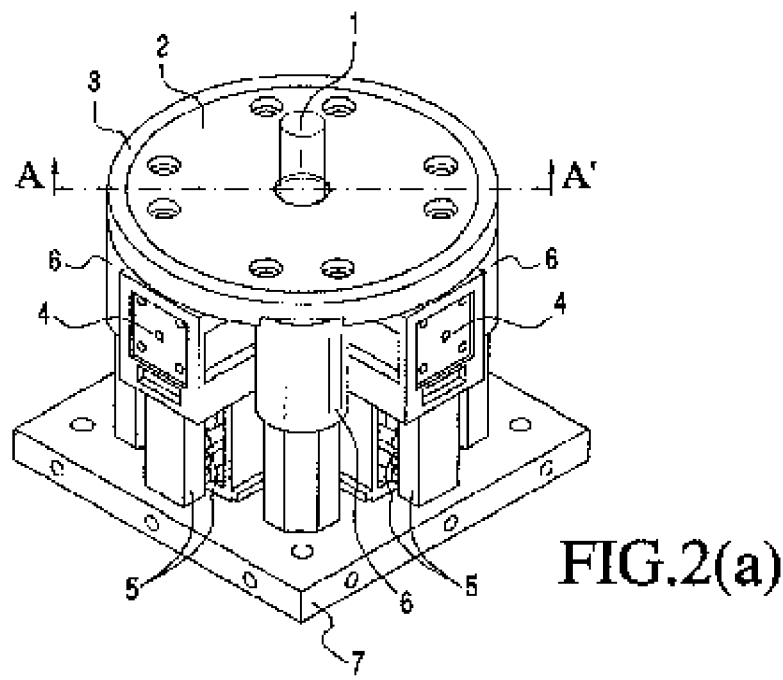
FIG. 2A illustrates one exemplary mechanical embodiment of the system, reduced to practice for a hundred nanoradian beam stabilization goal.
Figure 2B:
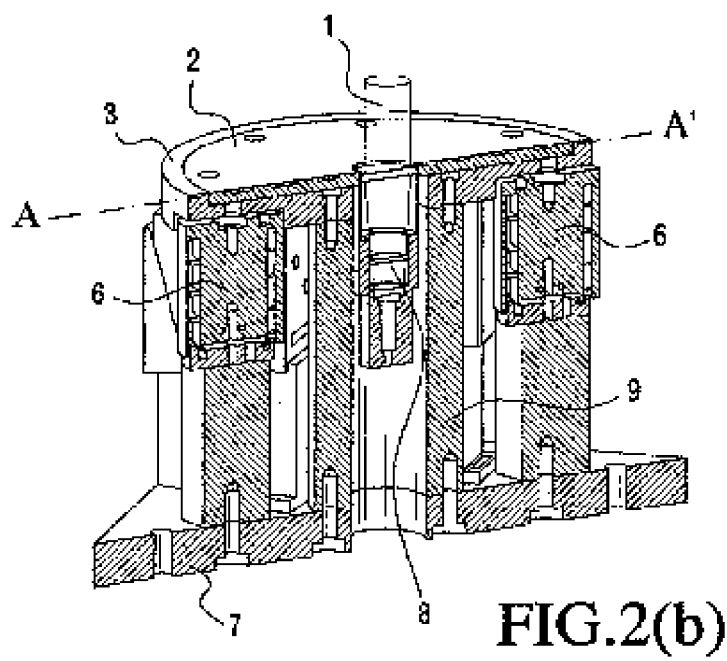
FIG. 2B is a cross sectional view of FIG. 2A.

Referring to the drawing figures, FIG. 1A illustrates an exploded mechanical layout of an exemplary embodiment of the apparatus, while FIG. 1B illustrates this embodiment as an integrated device. FIG. 2A and 2B illustrate a composite mechanical view and a cross-section of this same exemplary embodiment.

The base 7 is a plate that attaches rigidly to the structure of an optical system external to this apparatus. The platform comprises an optical assembly 2 rigidly attached to a plate 3. In this embodiment, the optical subassembly includes an attached fiber optic interface 8 for accepting and shaping the beam from an optical fiber from a laser light source (not shown). An optical reference beam 1 is emitted perpendicular to the surface of the platform.

The stable platform 3 is attached to the base 7 through a mechanical flexure 9 that allows motion in two directions that correspond to tip and tilt of the platform relative to the base. Note that in this embodiment, the flexure is a hollow cylinder and that the fiber optic interface 8 or the optical assembly 2 extends into the cavity within the flexure 9.

Four high-bandwidth angular rate sensors 4 are attached to the platform plate 3. These angular rate sensors measure high frequency motion of the platform in inertial space. The four angular rate sensors are arranged along two orthogonal axes. Each axis incorporates one pair of angular rate sensors positioned on opposite sides of the plate. These two equipoised angular rate sensors provide: (1) mass balance across the plate, (2) redundant signals that can be processed to reduce measurement noise, and (3) redundant signals that enable continued operation despite failure of one sensor on either axis or both axes. In this embodiment, the angular rate sensors are implemented as Magnetohydrodynamic angular rate sensors (U.S. Pat. No. 5,067,351). The electronic signal from the four angular rate sensors are transferred via cabling (not shown) to the controller.

Four linear displacement sensors 5 measure displacement of the platform plate 3 relative to the base 7. In this exemplary embodiment, the linear displacement sensors are collocated with the positions of the angular rate sensors 4. Thus the four linear displacement sensors exhibit the same four-fold symmetry, mass balance, and redundancy characteristics itemized in the previous paragraph for the angular rate sensors. In this embodiment, the linear displacement sensors are implemented as E/U linear variable differential transducers (U.S. Pat. No. 5,469,053). One component of the E/U linear variable differential transducer is attached to the stable platform at the angular rate sensor 4. The other component of the E/U linear variable differential transducer is attached to the base 7 beneath the angular rate sensor. The signal results from motion of the component attached to the platform relative to the component attached to the base. The electronic signal from these four sensors are transferred via cabling (not shown) to the controller.

Four actuators 6 move with respect to the base 7 to maintain the platform 3 at a stable angular position in inertial space or to point the platform to a new position in inertial space. In this embodiment the four actuators are disposed along two orthogonal axis at 45° relative to the axes defined by the sensor elements. The distribution of the actuators exhibit four-fold symmetry about the center of the platform. Thus the four actuators exhibit the same mass balance and redundancy characteristics as itemized for the angular rate sensors and the linear displacement sensors. The actuator are electronically commanded and provide feedback to the controller through cabling (not shown).

The angular rate sensors 4, linear displacement sensors 5, and actuators 6 are all symmetrically placed with four-fold symmetry about an axis perpendicular to the stable platform 2 and parallel to the center of the optical beam 1.

Figure 3A:
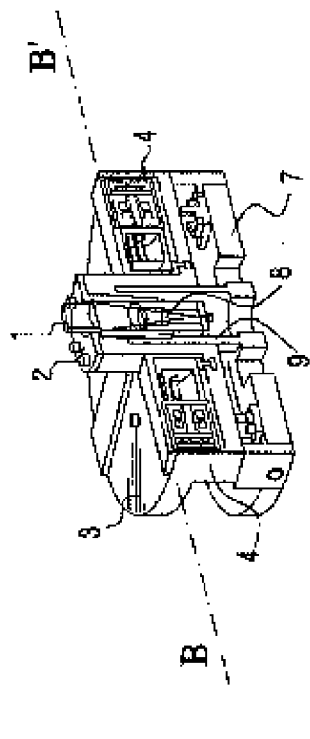
FIG. 3A illustrates a second exemplary mechanical embodiment of the system, reduced to practice for a tens of nanoradian beam stabilization goal.
Figure 3B:
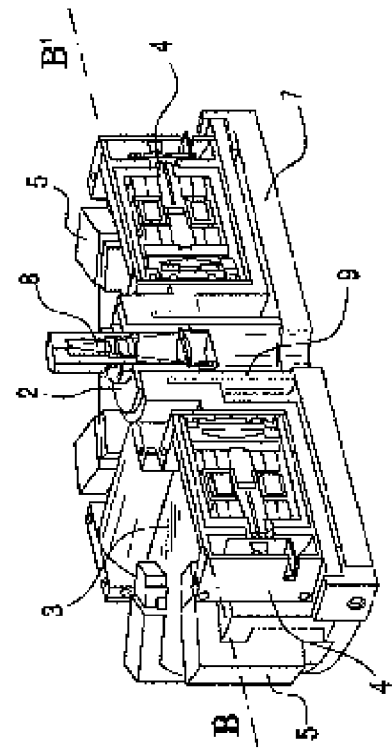
FIG. 3B is a cross sectional view of FIG. 3A.
Figure 3C:
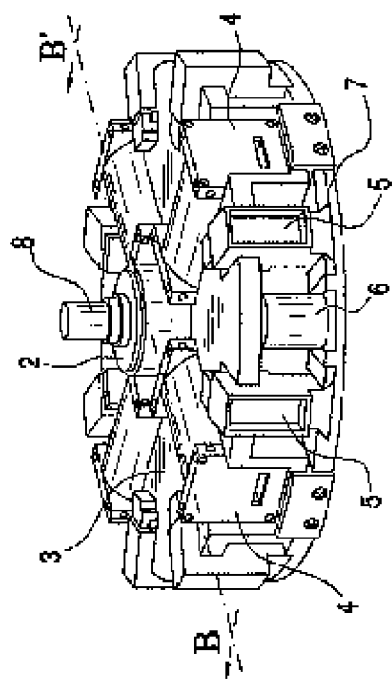
FIG. 3C illustrates a third exemplary mechanical embodiment of the systems.
Figure 3D:
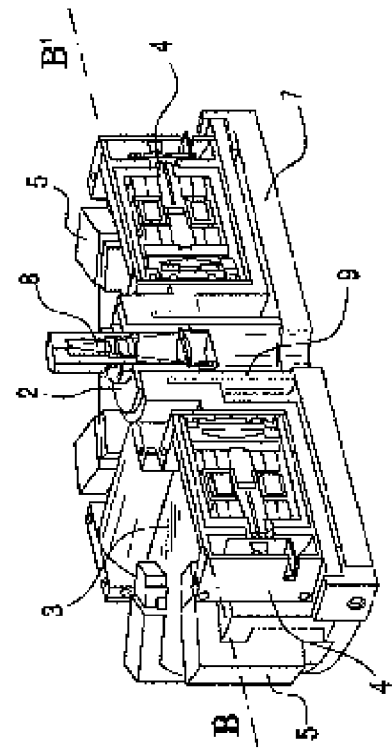
FIG. 3D is a cross sectional view of FIG. 3C.

FIGS. 3A–3D shows a second and third exemplary embodiment of the apparatus. The labeled components 1–9 correspond to the same components in the previous discussion of FIGS. 1 and 2. FIGS. 3A–3B embodiment reflects a packaging difference from the first embodiment shown in FIGS. 1 and 2. Slightly different angular rate sensors 4, linear displacement sensors 5 are used. FIGS. 3C–3D embodiment reflects significantly higher performance requirements (lower optical beam jitter) than the first embodiment shown in FIGS. 1 and 2. However, in this embodiment, the angular rate sensors 4 are considerably larger to provide higher precision. The accommodation of the larger rate sensors results in a larger diameter platform plate 3. However, the height of the apparatus is reduced by placing the linear displacement sensors 5 at the sides of each angular rate sensor 4 rather than beneath them as in the embodiment in FIGS. 1 and 2. The height of the post for the actuators 6 is similarly reduced without any loss of functionality. Note that to preserve the desirable redundancy and mass balance characteristics outlined in previous paragraphs, the number of linear displacement sensors 5 has been increased to eight. These eight linear displacement sensors are arranged in pairs on each side of the angular rate sensors 4.

Many embodiments of the current invention are possible based on similar reconfigurations of the key components as shown in FIGS. 1A through 3B.

FIGS. 4A and 4B illustrate details of the optical assembly that is common to both exemplary embodiments described in FIGS. 2A and 3A. In this embodiment, the optical assembly 2 consists of the top mounting plate and the fiber optic interface 8. This interface comprises the actual mechanical interface 11 where the optical fiber attaches to the assembly and a set of collimating optics 10 that expands and forms the optical reference beam. This reference beam 1, exits the assembly perpendicular to its planar surface. Alternate embodiments are possible for coupling the beam to the optical assembly and producing a pencil beam exiting from the aperture.

Figure 5:
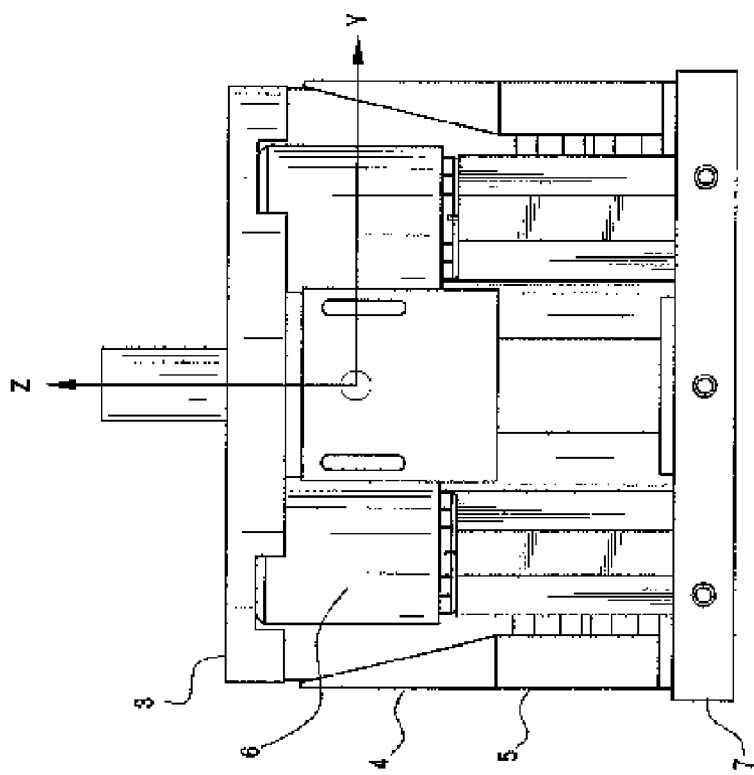
FIG. 5 illustrates the symmetry of the preferred embodiment of the apparatus.

FIG. 5 illustrates a key innovation in the illustrated embodiments of this apparatus. The high degree of symmetry in the platform, flexure, and placement of the sensing and actuating components results in superior control dynamics. The apparatus is designed to align the platform center of mass, the platform center of rotation, the angular rate sensor sense axes and the centers of force application about the same point along the pointing axis of the device. The alignment of center of mass with the center of rotation minimizes cross-axis coupling and the influences of linear vibrations. The alignment of angular rate sensors sense axes with the axes of platform rotation also minimize measurement errors. In the figure, the Z axis represents the pointing axis of the reference beam. The X axis (out of the page) and Y axis align with the sense axes of the angular rate sensors. The center of the resulting coordinate system is the balance point for rotations and force application, resulting in very high dynamic response.

Figure 6:
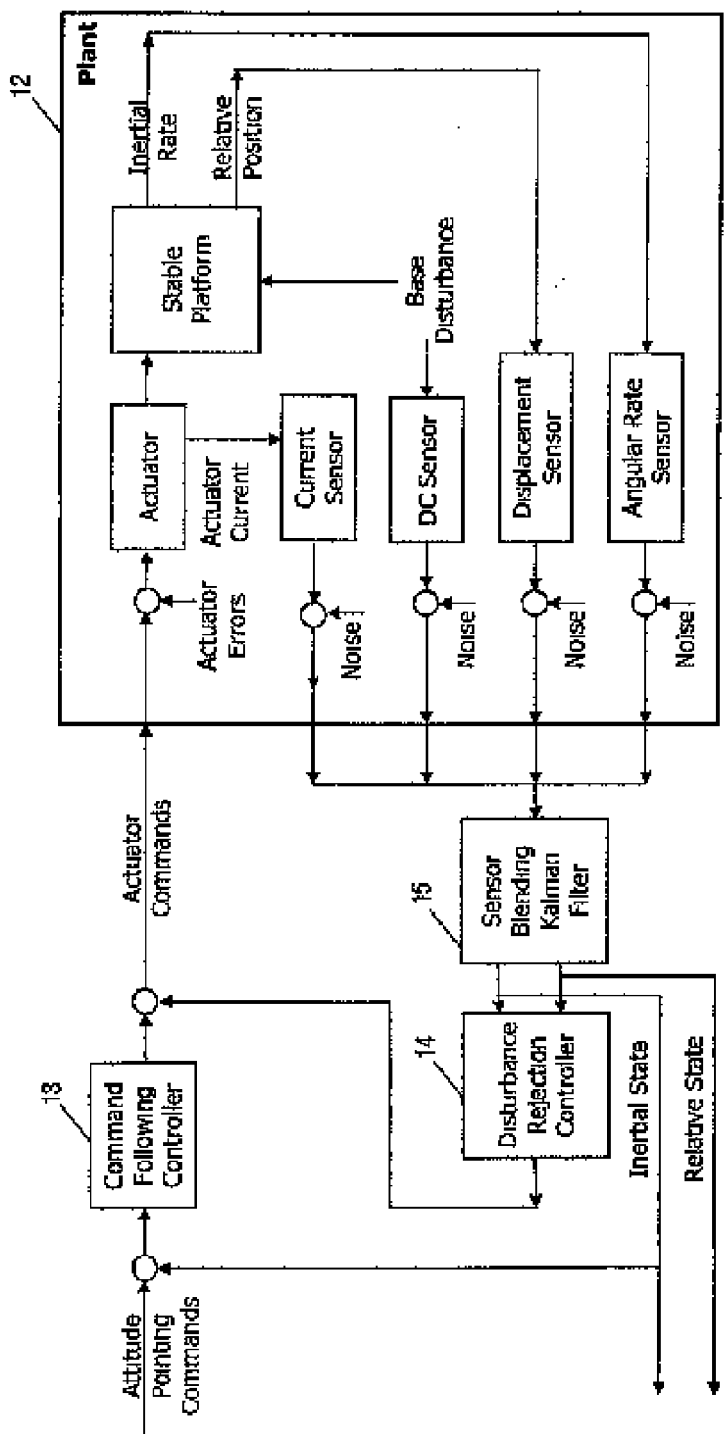
FIG. 6 illustrates the electronic control system for the optical inertial unit.

FIG. 6 illustrates another key innovation in the preferred embodiment of this apparatus. In this control system diagram, the mechanical apparatus described thus far is designated the Plant 12. The Command Following Controller 13 receives Attitude Pointing Commands from an external source. It issues commands to the actuators 6 to implement the pointing command in inertial space. The Disturbance Rejection Controller 14 generates actuator commands to reduce the inertial reference units jitter about the Attitude Pointing Commands. The controller also implements a Sensor Blending Kalman Filter 15 that estimates the state of the system based on feedback from the actuators 6, the angular rate sensors 4, the displacement sensors 5, and a low-frequency DC sensor external to this apparatus but connected to a common base. Based on these feedback signals and the detailed dynamic model of the apparatus, the digital Sensor Blending Kalman Filter can accurately estimate the current state of the apparatus and provide this information to the real-time controller. In addition, the inertial state and/or relative state can be sent back to an external source for its use.

The Kalman Filter estimates a process by using a form of feedback control. That is the filter estimates the process-state at some time and then obtains feedback in the form of real and noisy measurements. As such, the equations for the Kalman Filter fall into two groups, a set of time update equations (predictor) and a set of measurement update equations (corrector). The time update equations are responsible for projecting forward in time the current state and error covariance estimates. The measurement update equations are responsible for the feedback, for incorporating a new measurement update into the estimate to obtain an improved estimate. The first task during the measurement update is to compute the Kalman gain and then use that gain weight the influence of the measurement error (innovation). The Kalman gain is also used to update the error covariance. After each time and measurement update pair, the process is repeated. The algorithm is illustrated in FIG. 7.

A generalized system block diagram fro the multiple sensor, blending Kalman Filter is shown in FIG. 8 or in detail $$[K_1 K_2] = P[H_1 H_2] \left( \begin{bmatrix} H_1 \\ H_2 \end{bmatrix} P[H_1 H_2] + \begin{bmatrix} J_1 & 0 \\ 0 & J_2 \end{bmatrix} \begin{bmatrix} R_1 & 0 \\ 0 & R_2 \end{bmatrix} \begin{bmatrix} J_1 & 0 \\ 0 & J_2 \end{bmatrix} \right)^{-1}$$

The innovation or measurement error is $$c = z - H\hat{x}$$

or in detail $$\begin{bmatrix} c_1 \\ c_2 \end{bmatrix} = \begin{bmatrix} z_1 \\ z_2 \end{bmatrix} - \begin{bmatrix} H_1 \\ H_2 \end{bmatrix} \hat{x}$$

The state update is $$\hat{x} = \hat{x} + Kc$$

or in detail $$\hat{x} = \hat{x} + [K_1 K_2] \begin{bmatrix} c_1 \\ c_2 \end{bmatrix}$$

And finally the error covariance update is $$P = P - KHP$$

or in detail $$P = P - [K_1 K_2] \begin{bmatrix} H_1 \\ H_2 \end{bmatrix} P$$

Determining good values for Q, R, and an initial P can be difficult. Poorly chosen values can lead to an "inconsistent" filter were state estimates diverge from the true state. Several tests for filter consistency have been developed and they have proven to be helpful in tuning a filter.

The state model for the blending Kalman Filter is:

$$x = Ax + Bu + Gw$$

The measurement model is:

$$z = Hx + Jv$$

except the variables are redefined slightly. Assuming a two sensors model for the details of equation 1 looks like $$\begin{bmatrix} z_1 \\ z_2 \end{bmatrix} = \begin{bmatrix} H_1 \\ H_2 \end{bmatrix} x + \begin{bmatrix} J_1 & 0 \\ 0 & J_2 \end{bmatrix} \begin{bmatrix} v_1 \\ v_2 \end{bmatrix}$$

Here, and in the figure, the subscripts denote the individual sensors 1 and 2. Everything about the models for the sensors can be different—the noise processes and the variables they measure. We also need to make a similar modification to the measurement covariance matrix $$R = \begin{bmatrix} R_1 & 0 \\ 0 & R_2 \end{bmatrix}$$

With those changes the Kalman Filter equations can be applied as before. The state and error covariance estimates are still $$\hat{x} = A\hat{x} + Bu$$

$$P = APA' + GQG'$$

The Kalman gain equation is $$K = PH'(HPH' + JRJ')^{-1}$$

FIG. 9 shows a high-level block diagram of a simulation used to evaluate the performance of this filter. The dynamic model of NGIRU was used to generate the Platform Inertial Rate, Base Inertial Rate, and Relative Angle signals. Each sensor's noise floor performance was modeled and the noise was added to the signals. These measurements are then supplied to the Sensor Blending Kalman Filter for processing. The Kalman Filter provides two basic outputs, an estimate of the original (uncorrupted by sensor noise) sensor signals and an estimate of the inertial angular displacement and rate of the Stable Platform.

It is this inertial angle that equates to the amount of jitter from a reference laser mounted to the Stable Platform. FIGS. 10 and 11 show the performance of this Blending Kalman Filter using the HRG, ARS-24 and E/U Core sensors. FIG. 10 shows the performance in Inertial Rate and FIG. 11 in Inertial Angle of the stable platform.

The figures are presented in noise Power Spectral Density (PSD). In both figures the thick line A is the error in the Kalman Filter's estimation. These errors are well below the other curves on the figures. A curve B on both figures shows the noise power of a Base DC Sensor. A curve C in both figures is the noise power of an ARS-24 sensor. The curve D in both figures is the noise power of an E/U Core sensor. For these figures, the E/U Core noise has been converted to an angular equivalent assuming a representative distance from the optical axis. Using the 2.5 km FOG instead of the HRG produces the same results and are not duplicated here.

That Spectral Blending approach resulted in an estimate of 8 nanoradians for the blended noise equivalent power (NEA) when using the HRG. FIG. 11 shows that using the Sensor Blending Kalman Filter reduces this NEA to 0.2 picoradians, over 4 orders of magnitude improvement. The reason for this improvement over the spectral blending approach comes from two areas. First, the Kalman Filter is an optimal filter under certain conditions. These conditions (linearity, noise independence, etc.) are very closely approximated in the real NGIRU system. For example, when operating correctly the NGIRU's components all operate near their null point with only small deviations. The symmetric design of NGIRU will minimize or eliminate many of the cross coupling mechanisms. The second reason for the dramatic improvement is due to the fact that the Kalman Filter contains a model of the dynamics of NGIRU. This greatly improves the estimation capability of the filter over the spectral blending approach which has no such knowledge of the dynamics.

The Table summarizes these results.

| Sensor Combination | Sensor 1 NEA 0.1–100 Hz (nanoradians) | Sensor 2 NEA 0.1–1000 Hz (nanoradians) | Spectral Blending Frequency (Hz) | Spectral Blended NEA 0.1–1000 Hz (nanoradians) | Kalman Filter Blended NEA 0.1–1000 Hz (nanoradians) |
|---|---|---|---|---|---|
| HRG & ARS-24 | 164 | 965 | 0.5 | 22 | 0.0002 |
| FOG & ARS-24 | 78 | 965 | 0.1 | 189 | 0.0002 |

The high-frequency sensors and small platform allow an increase in the active isolation servo bandwidth. This additional bandwidth allows the servo to reject base motion vibrations with at least 10 dB of improved isolation than any existing inertial reference unit over the frequency band 1–100 Hz. This improved isolation is needed to meet error budgets on the order of tens to hundreds of nanoradians for unrejected base motion in the presence of airborne and space vibration environments. The Sensor Blending Kalman Filter allows measurements from on-platform, off-platform, and relative position sensors to be optimally combined.

The high-frequency sensors and small platform allow an increase in the active isolation servo bandwidth. This additional bandwidth allows the servo to reject base motion vibrations with at least 10 dB of improved isolation than any existing inertial reference unit over the frequency band 1–100 Hz. This improved isolation is needed to meet error budgets on the order of tens to hundreds of nanoradians for unrejected base motion in the presence of airborne and space vibration environments. The Sensor Blending Kalman Filter allows measurements from on-platform, off-platform, and relative position sensors to be optimally combined.

What is claimed as new and desired to be protected by Letters Patent of the United States is:

1. A system for stabilizing an optical reference beam comprising:
    a base;
    a platform attached to said base supporting an optical source;
    a first plurality of sensors attached to said platform for measuring the motion of said platform in inertial space;
    a second plurality of sensors measuring the relative displacement of said platform with respect to said base;
    a plurality of actuators for changing the position of said platform with respect to said base; and
    a control system connected to said actuators and said first and second plurality of sensors for positioning said platform in space at a fixed orientation, said control system comprising
        (a) a Kalman filter that estimates a system inertial state and relative state for said platform from said first and second plurality of sensors and current from said actuators; and
        (b) a controller for receiving attitude pointing commands and combining said commands with said inertial state and said relative state to generate commands for said actuators to position said platform.

2. The system according to claim 1, wherein said first plurality of sensors are angular rate sensors.

3. The system for stabilizing an optical reference beam according to claim 1, wherein said second plurality of sensors are displacement sensors.

4. The system for stabilizing an optical reference beam according to claim 1, wherein said platform center of rotation and the axis of said angular rate sensors are coincident.

5. The system for stabilizing an optical reference beam according to claim 1, further comprising a disturbance rejection controller for reducing the inertial reference unit jitter of said optical source.

6. The system according to claim 1, further comprising a sensor for detecting a disturbance of a common base of a stable platform.

7. The system for stabilizing an optical reference beam of claim 1, wherein the optical source comprises a optical fiber and collimating optics connected to a source of laser energy.

8. The system for stabilizing an optical reference beam according to claim 1, wherein the second plurality of sensors measure the relative displacement of the platform with respect to a base.

9. The system for stabilizing an optical reference beam according to claim 1 wherein said second plurality of sensors are linear variable differential transducers.

10. An opto-mechanical apparatus for producing an inertially stabilized optical reference beam, comprising:
    a base;
    a stabilized platform attached to the base by means of a mechanical flexure;
    an optical source affixed to the stabilized platform;
    a plurality of sensors attached to the platform measuring the platform motion in inertial space;
    a plurality of sensors measuring the relative displacement of platform with respect to said base;
    a plurality of actuators; and
    a control system that commands said actuators to point and hold the platform at a fixed orientation in inertial space.

11. An apparatus as in claim 10, wherein the base is rigidly affixed to an optical system that includes a low frequency DC motion sensor.

12. An apparatus as in claim 10, wherein the mechanical flexure is a hollow cylinder allowing flexion in two axes.

13. An apparatus as in claim 10, wherein the optical source is a laser beam coupled to the platform through an optical fiber.

14. An apparatus as in claim 13, wherein the laser beam is expanded and collimated through a series of lenses rigidly attached to the platform.

15. An apparatus as in claim 10, wherein the plurality of sensors attached to the platform measuring the platform motion in inertial space are angular rate sensors.

16. An apparatus as in claim 15, wherein the plurality of angular rate sensors are based on a magnetohydrodynamic (MHD) effect.

17. An apparatus as in claim 10, wherein the plurality of sensors measuring the relative displacement of the platform with respect to the base are linear variable differential transducers.

18. An apparatus as in claim 17, wherein the linear variable differential transducers are E/U linear variable differential transducers.

19. An apparatus as in claim 10, wherein the actuators are voice-coil actuators.

20. An apparatus as in claim 10, wherein the control system is implemented by digital means.

21. An apparatus as in claim 20, wherein the digital means of the control system includes a Kalman filter.

22. An apparatus as in claim 21, wherein the Kalman filter is digital and a Sensor Blending Kalman Filter that estimates system state based on sensor signals both from on-platform sensors and off-platform sensors.

23. An apparatus as in claim 22, wherein the off-platform sensors provide low-frequency and direct current (DC) motion measurements while the on-platform sensors provide high-frequency vibration measurements.

24. An apparatus as in claim 10, wherein the control system accepts commands from an external system to point the optical reference beam in inertial space.

25. An apparatus as in claim 10, wherein the control system provides feedback signals to an external system to allow an external system to follow pointing of the optical reference beam.

26. An apparatus as in claim 10, wherein the control system provides feedback signals to an external system indicating the inertial pointing attitude of the reference laser.

27. An apparatus as in claim 10, wherein the center of rotation is aligned with a center of mass for the platform.

28. An apparatus as in claim 10, wherein the center of force for actuation is aligned with a center of mass for the platform.

29. An apparatus as in claim 10, wherein the center of the rotational sense axes are aligned with a center of mass for the platform.

30. An apparatus as in claim 10, wherein the plurality of inertial sensors is arranged symmetrically about a center axis of the system.

31. An apparatus as in claim 30, wherein the plurality of inertial sensors is comprised of two redundant pairs of sensors.

32. An apparatus as in claim 31, wherein the rotational sense axes are parallel for one redundant pair of sensors and orthogonal to sense axes of the other redundant pair of sensors.

33. An apparatus as in claim 31, wherein the rotational sense axes are aligned orthogonal to the beam propagation axis of the reference laser.

34. An apparatus as in claim 31, wherein the measurements from the plurality of inertial sensors with collinear sense axes can be used as an averaged measurement or separately in the case of detecting and correcting for sensor failures.

35. An apparatus as in claim 10, wherein the plurality of relative displacement sensors is arranged symmetrically about a center axis of the system.

36. An apparatus as in claim 35, wherein the plurality of relative displacement sensors is comprised of two redundant pairs of sensors.

37. An apparatus as in claim 36, wherein the rotational sense axes are parallel for one redundant pair of sensors and orthogonal to sense axes of the other redundant pair of sensors.

38. An apparatus as in claim 36, wherein the rotational sense axes are aligned orthogonal to the beam propagation axis of the reference laser.

39. An apparatus as in claim 36, wherein the measurements from the plurality of relative displacement sensors with collinear sense axes can be used as an averaged measurement or separately in detecting and correcting for sensor failures.

40. An apparatus as in claim 10, wherein the plurality of actuators is arranged symmetrically about a center axis of the system.

41. An apparatus as in claim 40, wherein the rotational actuation axes are parallel for one pair of actuators and orthogonal to the actuation axes of the other pair of actuators.

42. An apparatus as in claim 40, wherein the rotational actuation axes are aligned orthogonal to the beam propagation axis of the reference laser.

43. A laser beam source apparatus with pointing accuracy and residual jitter at sub-microradian levels, comprising:
  a base;
  a stabilized platform attached to the base by a mechanical flexure that allows platform to tilt in two independent axes;
  a laser beam coupled to the stabilized platform and pointed with the platform;
  a plurality of high bandwidth sensors arrayed symmetrically about the platform and attached to the platform to measure platform motion in inertial space;
  a plurality of high bandwidth sensors arrayed symmetrically about the platform measuring the relative displacement of platform with respect to base;
  a plurality of high bandwidth actuators arrayed symmetrically about the platform between platform and base; and
  a control system that commands said actuators to point and hold the platform at a fixed orientation in inertial space.

44. An apparatus as in claim 43, wherein the base is rigidly affixed to an optical system that includes a low frequency and direct current (DC) motion sensor.

45. An apparatus as in claim 43, wherein the plurality of high bandwidth sensors attached to the platform to measure platform motion in inertial space are angular rate sensors.

46. An apparatus as in claim 45, wherein the angular rate sensors are based on magnetohydrodynamic (MHD) effect.

47. An apparatus as in claim 43, wherein the plurality of high bandwidth sensors measuring the relative displacement of platform with respect to base are linear variable differential transducers.

48. An apparatus as in claim 47, wherein the linear variable differential transducers are E/U linear variable differential transducers.

49. An apparatus as in claim 43, wherein the actuators are voice-coil actuators.

50. An apparatus as in claim 43, wherein the control system is implemented by digital means.

51. An apparatus as in claim 50, wherein the digital means of the control system includes a Kalman filter.

52. An apparatus as in claim 51, wherein the Kalman filter is a Sensor Blending Kalman Filter that estimates system state based on sensor signals both from on-platform sensors and off-platform sensors.

53. An apparatus as in claim 52, wherein the off-platform sensors provide low-frequency and direct current (DC) motion measurements while the on-platform sensors provide high-frequency vibration measurements.

54. An apparatus as in claim 53, wherein the control system accepts commands from an external system to point the optical reference beam in inertial space.

55. An apparatus as in claim 53, wherein the control system provides feedback signals to an external system to allow the external system to follow pointing of the optical reference beam.

56. An apparatus as in claim 53, wherein a center of rotation is aligned with a center of mass for the platform.

57. An apparatus as in claim 53, wherein a center of force for actuation is aligned with a center of mass for the platform.

58. An apparatus as in claim 53, wherein a center of the rotational sense axes are aligned with a center of mass for the platform.

59. A compact symmetrical optical inertial reference unit for producing an inertially stabilized laser beam, comprising:
 a base;
 a stabilized platform attached to the base by a mechanical flexure that allows platform tilt in two independent axes;
 a laser beam coupled to the stabilized platform and pointed with the platform;
 a plurality of angular rate sensors attached redundantly and symmetrically to the platform measuring the platform motion in inertial space;
 a plurality of sensors attached redundantly and symmetrically to the platform measuring the relative displacement of platform with respect to base;
 a plurality of actuators arranged redundantly and symmetrically between base and platform;
 a digital control system that commands said actuators to point and hold the platform at a fixed orientation in inertial space; and
 a Sensor Blending Kalman Filter that estimates a state of the system based on high frequency signals from the platform sensors and low-frequency signals from a direct current (DC) sensor external to the optical inertial reference unit.

60. An apparatus as in claim 59, wherein a center of rotation is aligned with a center of mass for the platform.

61. An apparatus as in claim 59, wherein a center of force for actuation is aligned with a center of mass for the platform.

62. An apparatus as in claim 59, wherein a center of the rotational sense axes are aligned with a center of mass for the platform.

* * * * *